UNITED STATES PATENT OFFICE.

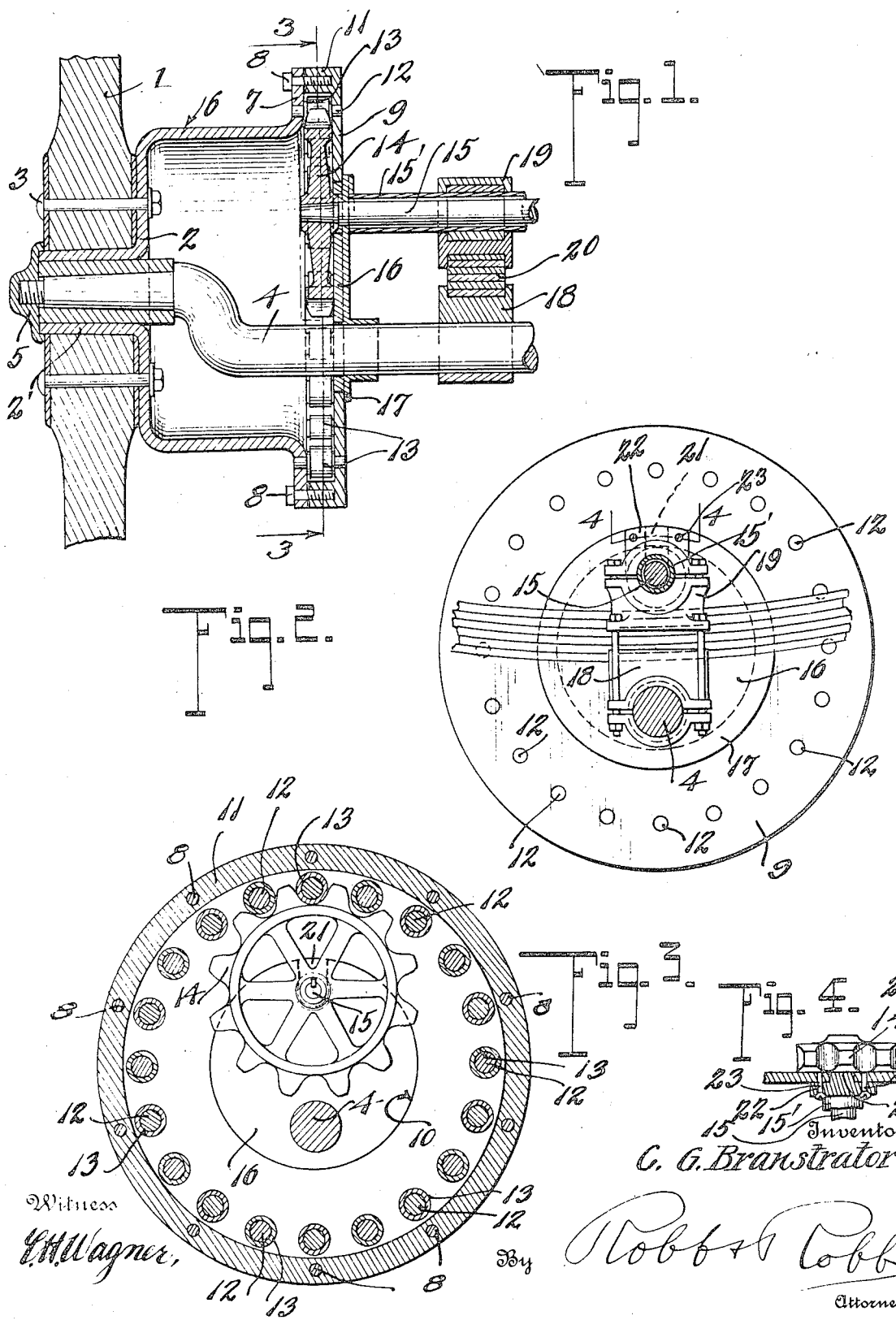

CLEM G. BRANSTRATOR, OF MONMOUTH, ILLINOIS, ASSIGNOR OF ONE-FOURTH TO HARVEY G. HERRING.

DRIVING MECHANISM FOR POWER TRANSMISSION.

1,240,302.  Specification of Letters Patent.  Patented Sept. 18, 1917.

Application filed November 15, 1916. Serial No. 131,464.

*To all whom it may concern:*

Be it known that I, CLEM G. BRANSTRATOR, a citizen of the United States, residing at Monmouth, in the county of Warren and State of Illinois, have invented certain new and useful Improvements in Driving Mechanism for Power Transmission, of which the following is a specification.

The present invention relates to improvements in power transmission mechanism, the application of which is herein disclosed as adapted for motor vehicles and is designed with a view to dispensing with the conventional chain and sprocket drive and elimination of the disadvantages of such power transmission incident to the noise, wear and difficult adjustment thereof.

To this end the invention consists of driving instrumentalities inclosed within a housing provided with a specially constructed closure for retaining the lubricant that may be introduced thereinto and more particularly for excluding the dust and dirt, said closure being so arranged in coöperation with the housing as to provide a bearing for certain of the driving instrumentalities above mentioned.

For a full understanding of the present invention reference is to be had to the following description and the accompanying drawings, in which:

Figure 1 is a vertical sectional view through an embodiment of my invention.

Fig. 2 is a side elevation, the vehicle axle and driving shafts being shown in section.

Fig. 3 is a vertical sectional view on the line 3—3 of Fig. 1; and

Fig. 4 is a fragmentary sectional view on the line 4—4 of Fig. 2.

Throughout the following detail description, and on the several figures of the drawing, similar parts are referred to by like reference characters.

Referring to the drawing, and specifically describing this invention, 1 indicates a vehicle driving wheel or other wheel or pulley to which it is desired to transmit power having secured thereto a housing or drum 2, as by means of fastening members 3, said wheel being revolubly mounted on the vehicle shaft 4, and secured thereon by means of a cap nut 5. The drum 2 is preferably formed with a lateral bearing extension 2' and is furthermore so constructed in relation to its width as to provide suitable brake surface 6. At the inner side of the drum 2 is formed an outwardly projecting flange 7 having a series of openings adjacent to its periphery to receive fastening members or stud bolts 8. The drum 2 is designed to be entirely closed and for this purpose I provide as hereinbefore premised a specially constructed closure plate or cover which includes the annular plate or disk 9 having a relatively large central opening 10 through which the vehicle axle 4 extends. The annular plate is provided with a lateral spacing flange 11 which is formed with a series of threaded openings to receive the bolts 8 hereinbefore mentioned for the purpose of fixing said plate on the inner side of the drum 2. This annular plate 9 and the flange 7 of the drum 2 are provided with corresponding series of openings to receive the pins or shafts 12 on each of which is mounted a roller bearing sleeve 13 of suitable anti-friction material. It will be apparent that the plate 9, while constituting a partial closure for the drum or housing 2 also forms a bearing for the roller bearing supports and said roller bearings are held from displacement by the said plate.

The roller bearings form an internal gear element of the driving instrumentalities and coöperating therewith is arranged a spur or driving gear 14 which is keyed to the end of the drive shaft 15 projecting through the central opening 10 of the annular plate 9.

To effectually close the housing 2, I provide the supplemental closure or dust plate 16 which is so constructed as to seat within the central opening 10 and is provided with suitable openings therethrough to accommodate the drive shaft 15 and the axle 4. The said central plate 16 is flanged annularly as indicated at 17 so as to abut against the face of the annular plate 9 and thereby form a leak-proof joint to prevent the lubricant which may be inserted into the drum from leaking out of the same. The central cover plate is obviously relatively stationary while the annular plate 9 revolves thereupon and, furthermore, said plate 16 abuts against the drive shaft housing 15' and is, therefore, held in proper coöperative relation with respect to its coacting closure member.

The numerals 18 and 19 indicate clamping means, most clearly shown in Fig. 2, for holding the axle 4 and drive shaft 15 in proper relation to each other, and the main spring 20 is preferably secured between the said parts by the clamping means.

In order to permit of displacement of the driving shaft 15 in the disassembling of the parts of this device, the central closure member 16 is provided with an open end slot 21 which slot, however, is normally closed by a plate 22 secured by fastening members 23 in said slot.

It will be apparent from the foregoing description that the driving instrumentalities are effectually protected by the arrangement from dust and dirt and the particular type of driving instrumentalities insure prolonged life of the parts most subject to wear. Such power transmission is especially suitable for vehicle trucks though I desire it to be understood that it may be utilized for power transmission work other than specified.

Having thus described my invention, what I claim as new is:

1. In combination, an axle, a driving wheel mounted on said axle, a housing secured to the wheel and through which the axle extends, driving means for said wheel disposed in the housing, and cover means for said housing comprising an annular plate partially closing the housing and having a central opening and a supplemental plate closing said central opening, said driving means passing through the supplemental plate and serving to hold the same operative.

2. In combination, an axle, a driving wheel mounted on said axle, a housing secured to the wheel through which the axle extends, a removable cover plate for closing said housing and comprising an annular bearing plate and a central dust plate coöperating therewith, power transmitting elements journaled in the housing and plate, and intermediate the same, a driving member extending into the housing and coöperating with the power transmitting members for actuating the wheel aforesaid, and a sleeve housing for the driving member abutting the central dust plate for holding the same operative.

3. In combination, an axle, a driven member carried thereby, a drum secured to said driven member, a closure for said drum comprising an annular disk having a lateral peripheral spacing flange, fastening members extending into said disk and securing it to the drum, roller members journaled between the disk and drum adjacent to the periphery of the latter, and a drive gear extending into said drum and meshing with the bearings aforesaid for actuating the driven member through the drum.

4. In combination, an axle, a driven member carried thereby, a drum secured to said driven member, a closure for said drum comprising an annular disk having a lateral peripheral spacing flange, fastening members extending into said disk and securing it to the drum, roller members journaled between the disk and drum adjacent to the periphery of the latter, a drive gear extending into said drum and meshing with the bearings aforesaid for actuating the driven member through the drum, said disk having a central opening, and a dust plate seated in said opening and upon the axle aforesaid.

5. In combination, an axle, a driven member carried thereby, a drum secured to said driven member, a closure for said drum comprising an annular disk having a lateral peripheral spacing flange, fastening members extending into said disk and securing it to the drum, roller members journaled between the disk and drum adjacent to the periphery of the latter, a drive gear extending into said drum and meshing with the bearings aforesaid for actuating the driven member through the drum, said disk having a central opening, a dust plate seated in said opening and upon the axle aforesaid, and means coacting with the dust plate to hold the same in operative position within the opening.

6. In combination, an axle, a driving wheel mounted thereon, a brake drum secured to said wheel and having an annular flange at its inner side, a closure for said drum secured to said flange and comprising an annular bearing plate and a dust plate coöperating therewith, roller members journaled in the annular plate and the drum flange, a drive shaft passing through said dust plate and arranged in spaced relation to the axle, and a driving gear carried by said driving shaft in meshing relation with respect to the roller bearings for actuating the driving wheel aforesaid, said dust plate having an open slot to permit displacement of the driving shaft with respect to the axle.

7. In combination, an axle, a driven member carried thereby, a housing secured to the member, an internal gear in the housing, a removable closure for the housing through which the axle extends, a drive gear meshing with internal gear, a shaft carrying the gear and passing through the closure, a supporting spring interposed between the shaft and axle, exterior of the housing, and a clamping means for each the shaft and the axle, said clamping means being connected to each other and securing the spring therebetween.

In testimony whereof I affix my signature.

CLEM G. BRANSTRATOR.